B. K. FORD.
ETHER CAN.
APPLICATION FILED FEB. 23, 1915.
1,197,197. Patented Sept. 5, 1916.
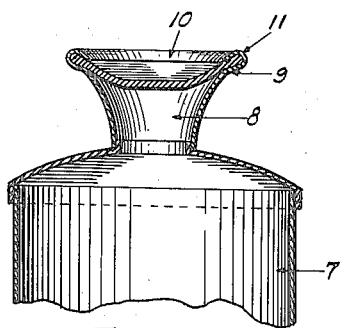
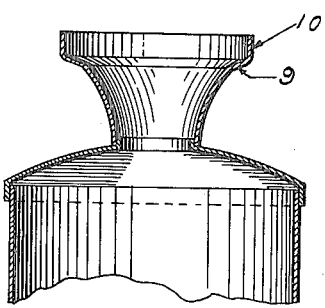
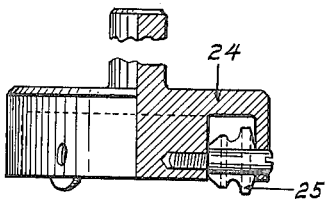
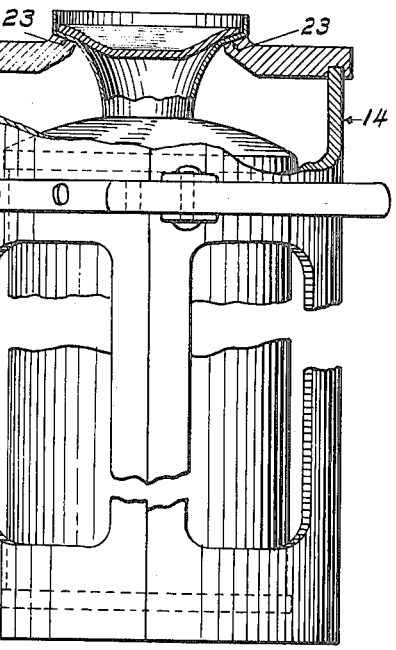
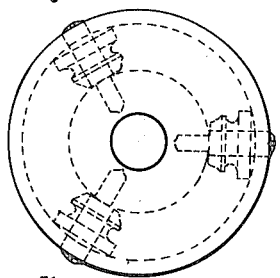
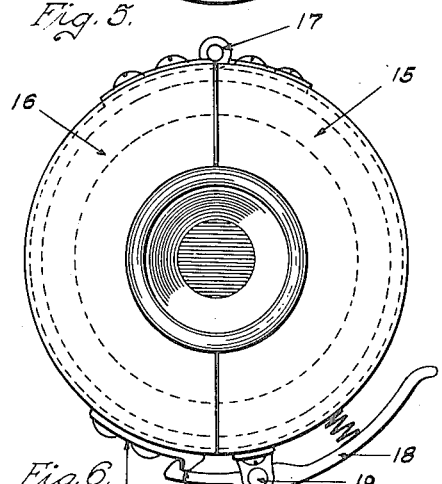
Witnesses.
Thomas J. O'Brien.
J. C. Carpenter
Inventor
Ben K. Ford
By Munday Evarts Adcock & Clark Attorney's

UNITED STATES PATENT OFFICE.

BEN K. FORD, OF OAK PARK, ILLINOIS, ASSIGNOR TO AMERICAN CAN COMPANY, OF NEW YORK, N. Y., A CORPORATION OF NEW JERSEY.

ETHER-CAN.

1,197,197.             Specification of Letters Patent.      Patented Sept. 5, 1916.

Application filed February 23, 1915. Serial No. 9,322.

*To all whom it may concern:*

Be it known that I, BEN K. FORD, a citizen of the United States, residing in Oak Park, in the county of Cook and State of Illinois, have invented a new and useful Improvement in Ether-Cans, of which the following is a specification.

My invention relates in general to containers, and more particularly to containers for ether, chloroform and other volatile liquids.

Prior to my invention considerable difficulty has been experienced in the marketing of ether and other highly explosive liquids by reason of the soldering during the closing of the cans or containers and the heating attendant upon this operation. Where solder is used, the heat necessary to its application is dangerous and the application of solder in any reasonably safe manner is expensive. Perfect safety is substantially impossible of attainment.

It is a principal object of this invention to provide a closure for ether cans and the like which may be positioned without the use of solder or in fact any auxiliary sealing medium, the interengagement of the closure with its surrounding parts effectually hermetically and permanently closing the container.

Prior to my invention also, considerable difficulty has been experienced in the leaking of the closures because of pressure against the closure resulting from vaporization within the container, which has at times pulled the closures from the solder or pulled the solder from sealing contact with the can.

It is a further object of this invention to provide a closure adapted to withstand great pressure from within without effect upon the connection between the closure and the can.

A still further object of the invention is the provision of a simple and easily practised method of permanently and hermetically sealing cans for ether, chloroform and the like.

In inclosing highly volatile and explosive substances such as ether or chloroform in metal containers it is the present practice to fill containers having a gromet nozzle, with chilled ether, then applying a soft metal convex cap to the opening and hand-solder it therein, using a bismuth solder having a melting point of about 120 degrees, and a hand soldering iron electrically heated.

High proof ether is so readily volatile that the instant the hot iron approaches within an inch of the can it begins to vaporize and the thin metal of the container transmits the heat from contact with the iron so quickly that it is necessary to first hold the cover down and solder it at two opposite spots, leaving plenty of space in the joint for escape of accumulating gas. The operator then applies solder a little at a time around the whole joint and has to effect a gas tight and hermetic seal while the ether gas generated by the hot iron is rapidly escaping.

The extreme difficulty and hazardousness of this operation makes the sealing of containers by this method very expensive and very slow. The gas escaping through the molten solder leaves minute and microscopic pin holes that have to be searched for diligently and all positively closed, or in a short time the entire contents of the can will evaporate. To locate these minute pin holes, the sealed cans of ether are chilled in a refrigerator and then plunged into hot water, thus quickly creating an intense pressure against the soldered joint, and as the cans are completely immersed in the water the pin hole leaks are detected by the escaping bubbles, in the well known way of water testing for leaky cans. The can showing a leak must then be resoldered and retested, and in some instances this is repeated many times before the seal is completely hermetic. On account of using a low melting bismuth solder and a soft metal convex cap, it is necessary to use a strong acid soldering flux which renders the closure very unsanitary and if any of the said acid comes in contact with the ether a very poisonous peroxid is formed.

These ether cans are largely used by physicians and in hospitals and are usually opened with a pen knife by simply cutting out the soft metal convex cap. Many of the cans have an excess of the bismuth solder around the edge which somewhat retards easy opening, and the presence of any of the acid flux or its precipitates, coming into contact with the ether as it is poured out of the solder-edged opening, will tend to contaminate it and render it unsanitary.

Ether sealed under the conditions I have enumerated will create so much pressure in the can in ordinary every-day temperatures, that the soft metal closures would be bulged outward, if they were not already outwardly convex, so that the practice has been to solder a previously bulged-out closure so there would be little if any further bulging under pressure, thereby reducing the chance of impairing the soldered joint and causing a leak during transit or storage in warm places.

A constant source of great danger existing from the use of a bulged-out cap for closing ether cans lies in damage resulting from rough handling during shipment and storage, wherein the soft metal closure is bent or deformed by coming into violent contact with a shipping case or any hard object. Since the cap is bulged outwardly it gets no protection whatever from the top edge of the gromet nozzle and is subject to any bump or abrasion; and furthermore, the fact of its being soldered in a bulged-out condition throws the entire strain of the internal pressure onto the soldered joint, there being no yielding diaphragm-action possible to relieve any of the pressure.

The closure that is the subject of this invention, most effectively overcomes all of the difficulties attending sealing and marketing ether, that I have enumerated, and has many advantages.

I employ the same can and practically the same gromet nozzle as is ordinarily used. I also employ a soft metal disk closure. I eliminate the dangerous heat entirely in effecting a hermetic seal, and am further able to hermetically close every can quickly, perfectly and at one operation, and by automatic machinery, thus greatly reducing the cost and danger incident to the old method and increasing the production in some instances ten times, besides entirely saving the expensive bismuth solder, making a sanitary, neat and clean-looking closure, and providing one that is hermetic under all conditions of handling and storage and that tends to become tighter and more secure when subjected to internal pressure.

Instead of bulging the closure disk outwardly, I bulge it inwardly and secure a hermetic joint by rolling or banding the edge of the nozzle down onto and embedding it into the soft metal of the concave closure disk and thereby hold it so securely that it is fully as strong and resistant as the walls of the container itself, and by bulging the sealing disk inwardly it is capable of outwardly yielding diaphragm-action under excessive pressure, thus relieving the pressure under severe conditions and preventing undue strain of all of the joints of the container. Of course, after once being bulged outwardly under excessive pressure it will remain in that position when the pressure diminishes. It is also protected from bumps and bends by normally lying below the rim of the nozzle, the cans of ether being packed and handled as easily and safely as most other canned products.

Other objects and advantages of the invention will be apparent as it is better understood from the following description when considered in connection with the accompanying drawing illustrating a preferred embodiment thereof.

Referring to the drawings, Figure 1 is a section taken through a can provided with a closure embodying my invention; Fig. 2 is a section through the disk-like closure before it is applied to the can; Fig. 3 is a section through the can before it has received the closure; Fig. 4 is a side elevation shown partially in section of an ether can and apparatus for sealing the same; Fig. 5 is a top plan view of the sealing head for such apparatus; and Fig. 6 is a similar view of the supporting means provided to hold the can while it is being closed.

For the purpose of illustrating my invention I have shown it embodied in an ether can 7 provided with the ordinary gromet nozzle 8. Before this can receives the closure this gromet nozzle is provided with an outwardly flaring flange 9 near its top and an upwardly extending sealing edge flange 10. The closure in the present instance consists of a dished metal disk 12. This disk is relatively thick and consists of a metal softer than the metal forming the can or container. It is positioned within the nozzle with its convex side disposed inwardly of the can and its edges resting upon the outwardly flaring flange 9. The upwardly extending sealing edge flange 10 is then bent or curled down upon the edge 11 of the sealing disk and the extremity of the flange 10 is forced into the material of the disk closure, as seen in Fig. 1.

In curling the edge of the flange 10 down upon the disk under pressure sufficient to cause this edge to enter into the material of the disk, a tight metal to metal contact is produced between the material of the disk and the material of the flange around the opening. Such a metal to metal contact produces an absolutely tight joint which cannot be destroyed without tearing the material of the disk itself within the edge embedded in it through internal pressure. This operation of sealing a can or container with a closure embodying my invention will now be described, in connection with a simple closing device embodying only the features necessary to clearly illustrate this part of my invention. The can is mounted in a suitable supporting housing 14, in the present instance consisting of two parts 15 and 16 hinged together along one side at 17 and adapted to be latched when in closed position, as shown in Figs. 4 and 6, by a latch 18 pivoted at 19 on the part 15 and engageable behind a shoulder 21 at 22 on the part 16. This casing or holder is preferably somewhat longer than the can and is adapted to stand upon any support or table during the sealing of the can. The can is held by engagement of jaws 23 beneath the flange 9 so that no pressure is exerted upon the body of the can itself. The sealing head 24, when the can is in this position, is lowered thereupon and its head carries a plurality of sealing rollers 25 adapted to curl down the flange 10 about the edge 13 of the closure, as already described. The can is thus held in folding condition during sealing. It will be manifest from the foregoing that the seal is dished and inserted so that its center is lower than its side edges and pressure from within the can will be felt against its convexity. This causes internal pressure to tend to produce peripheral expansion of the closure, which is resisted by the overfolded flange 10. The pressure is transformed into forces extending outwardly in the plane of the edge 13 instead of axially of the nozzle as is the usual case.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:—

1. A container of the character described, comprising a body having an opening at its top and a metal closure for said opening, said closure being of disk-like inwardly convex form and arranged in said opening to expand peripherally under pressure from within said container, the walls of said opening being formed to resist peripheral expansion of said closure, and the inward convexity of the closure extending to the points where it is engaged by the parts of said body.

2. A container of the character described, comprising a body having an opening in its top and a disk-like closure seated in said opening, said closure being deflected inwardly of said container at its center and the edges of the body about said opening being bent over the edges of said closure and engaging its inwardly deflected portion.

3. A container of the character described, comprising a body having a filling opening and a disk closure of soft metal seated in said opening, the edges of the body about said opening being bent over the edges of said closure and forced into the metal thereof, the portion of the closure adjacent said edges being arranged with respect to the body of the closure to radially transmit pressure felt by the closure from within the container outwardly against the edges of the body about the opening and embracing the edges of said closure.

4. A container of the character described, comprising a body provided with a gromet nozzle and a soft metal disk closure for said nozzle, the edge of said nozzle being bent over and forced into the metal of said closure and the center portion of said closure being located inwardly of said edges.

5. A container of the character described, comprising a body provided with a gromet nozzle and a soft metal lead-like disk closure for said nozzle, the edge of said nozzle being bent over said closure and having a hermetic metal-to-metal contact therewith and the center portion of said closure being located inwardly of said edges.

6. A container and its closure of the character described, comprising a flange on the container, an inwardly dished disk of softer metal than the flange, the flange and the disk being adapted to be brought into hermetic metal to metal contact.

7. A container and its closure of the character described, comprising a flange on the container, an inwardly dished and convex disk of softer metal than the flange, the flange and the disk being adapted to be brought into metal to metal hermetic contact with the edge of said flange curled over and embedded in the softer metal of the disk.

8. A sheet metal ether can having an outwardly flared nozzle terminating in an upwardly extending flange, combined with an inwardly dished and convex soft metal disk-like closure adapted to fit within the upwardly extending flange so as to rest on the outwardly flared portion of the nozzle, the upwardly extending flange being adapted to be curled over the edge of said closure to form a metal-to-metal hermetic contact with the closure.

Signed in the presence of two subscribing witnesses.

BEN K. FORD.

Witnesses:
J. C. CARPENTER,
T. J. O'BRIEN.